United States Patent
Sato et al.

(10) Patent No.: US 7,678,481 B2
(45) Date of Patent: Mar. 16, 2010

(54) FUEL CELL SYSTEM WITH A FUEL TANK CONFIGURED TO STORE A FUEL AT A PRESSURE HIGHER THAN ATMOSPHERIC PRESSURE

(75) Inventors: Yuusuke Sato, Tokyo (JP); Nobutaka Kikuiri, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 472 days.

(21) Appl. No.: 11/511,339

(22) Filed: Aug. 29, 2006

(65) Prior Publication Data

US 2007/0111056 A1    May 17, 2007

Related U.S. Application Data

(63) Continuation of application No. 10/673,154, filed on Sep. 30, 2003, now Pat. No. 7,264,897.

(30) Foreign Application Priority Data

| Sep. 30, 2002 | (JP) | 2002-288061 |
| Sep. 30, 2002 | (JP) | 2002-288066 |
| Sep. 30, 2002 | (JP) | 2002-288069 |

(51) Int. Cl.
*H01M 8/06* (2006.01)
*H01M 8/04* (2006.01)

(52) U.S. Cl. ............... 429/25; 429/19; 429/20

(58) Field of Classification Search ........ None
See application file for complete search history.

(56) References Cited

U.S. PATENT DOCUMENTS

| 6,352,792 | B1 | 3/2002 | Parchamazad |
| 6,440,594 | B1 * | 8/2002 | Kindler et al. ............... 429/13 |
| 6,455,008 | B1 | 9/2002 | Aoyama et al. |
| 6,777,116 | B1 | 8/2004 | Muller et al. |
| 2001/0014300 | A1 | 8/2001 | Hashigaya et al. |
| 2001/0049907 | A1 | 12/2001 | Inoue |
| 2002/0045078 | A1 | 4/2002 | Kawasumi et al. |
| 2002/0131907 | A1 | 9/2002 | Iwasaki |
| 2004/0101720 | A1 | 5/2004 | Ogawa |

FOREIGN PATENT DOCUMENTS

| EP | 1 065 741 A2 | 1/2001 |
| EP | 1 211 743 A2 | 6/2002 |
| JP | 10-255830 | 9/1998 |
| JP | 2001-35518 | 2/2001 |
| WO | WO 98/00878 | 1/1998 |

* cited by examiner

*Primary Examiner*—Jonathan Crepeau
*Assistant Examiner*—Tony Chuo
(74) *Attorney, Agent, or Firm*—Oblon, Spivak, McClelland, Maier & Neustadt, L.L.P.

(57) ABSTRACT

A fuel cell system includes a fuel tank configured to store a fuel at a pressure higher than atmospheric pressure; a vaporizer configured to vaporize the fuel; a reformer configured to reform the vaporized fuel into a hydrogen rich gas; a CO gas removal apparatus configured to remove CO gas in the hydrogen rich gas; and a cell unit configured to generate electricity by allowing the hydrogen rich gas to react to oxygen.

11 Claims, 13 Drawing Sheets

FUEL CELL SYSTEM WITH A FUEL TANK CONFIGURED TO STORE A FUEL AT A PRESSURE HIGHER THAN ATMOSPHERIC PRESSURE

CROSS REFERENCE TO RELATED APPLICATIONS

The present continuation application claims the benefit of priority under 35 U.S.C. §120 from U.S. application Ser. No. 10/673,154, filed on Sep. 30, 2003 (now U.S. Pat. No. 7,264,897. This application is based upon and claims the benefit of priority under 35 U.S.C. §119 from the prior Japanese Patent Applications No. P2002-288061, P2002-288066, P2002-288069 filed on Sep. 30, 2002; the entire contents of which are incorporated herein by reference.

BACKGROUND OF THE INVENTION

1. Field of the Invention

The present invention relates to a fuel cell system, more particularly, to a fuel cell system using a proton exchange membrane fuel cell (PEMFC).

2. Description of the Related Art

Fuel cells are classified into a polymer electrolyte fuel cell, a phosphoric-acid fuel cell, an alkaline fuel cell, a molten carbonate fuel cell, a solid oxide fuel cell and the like, depending on the kinds of electrolytes to be used. As to hydrogen to be supplied to the fuel cell, fuel such as natural gas, propane gas and methanol, are supplied after being converted into hydrogen rich gas by a reformer. Meanwhile, air supplied to the reformer for generating the hydrogen rich gas and to the fuel cell is directly supplied by use of a compressor and the like.

In such a fuel cell system, a pump for supplying to a cell unit with air and fuels is required. However, since the capacity of the pump used in the fuel system is large, the system may be enlarged. Furthermore, a motor in the pump may generate loud noises.

The present invention was made for solving the foregoing problems. An object of the present invention is to provide a fuel cell system with a small and simple structure without a pump for supplying fuel and/or air to the reformer and/or the cell unit.

SUMMARY OF THE INVENTION

An aspect of the present invention inheres in a fuel cell system encompassing a fuel tank configured to store a fuel at a pressure higher than atmospheric pressure; a vaporizer configured to vaporize the fuel; a reformer configured to reform the vaporized fuel into a hydrogen rich gas; a CO gas removal apparatus configured to remove CO gas in the hydrogen rich gas; and a cell unit configured to generate electricity by allowing the hydrogen rich gas to react with oxygen.

Another aspect of the present invention inheres in a fuel cell system encompassing a fuel tank configured to store a fuel at a pressure higher than atmospheric pressure; a reformer configured to reform the fuel into a hydrogen rich gas; a water tank configured to store water to be supplied to the reformer, being coupled to the fuel tank; a vaporizer configured to vaporize the water in the water tank; a CO gas removal apparatus configured to remove CO gas in the hydrogen rich gas; and a cell unit configured to generate electricity by allowing the hydrogen rich gas to react with oxygen.

DETAILED DESCRIPTION OF THE INVENTION

Figure 1:
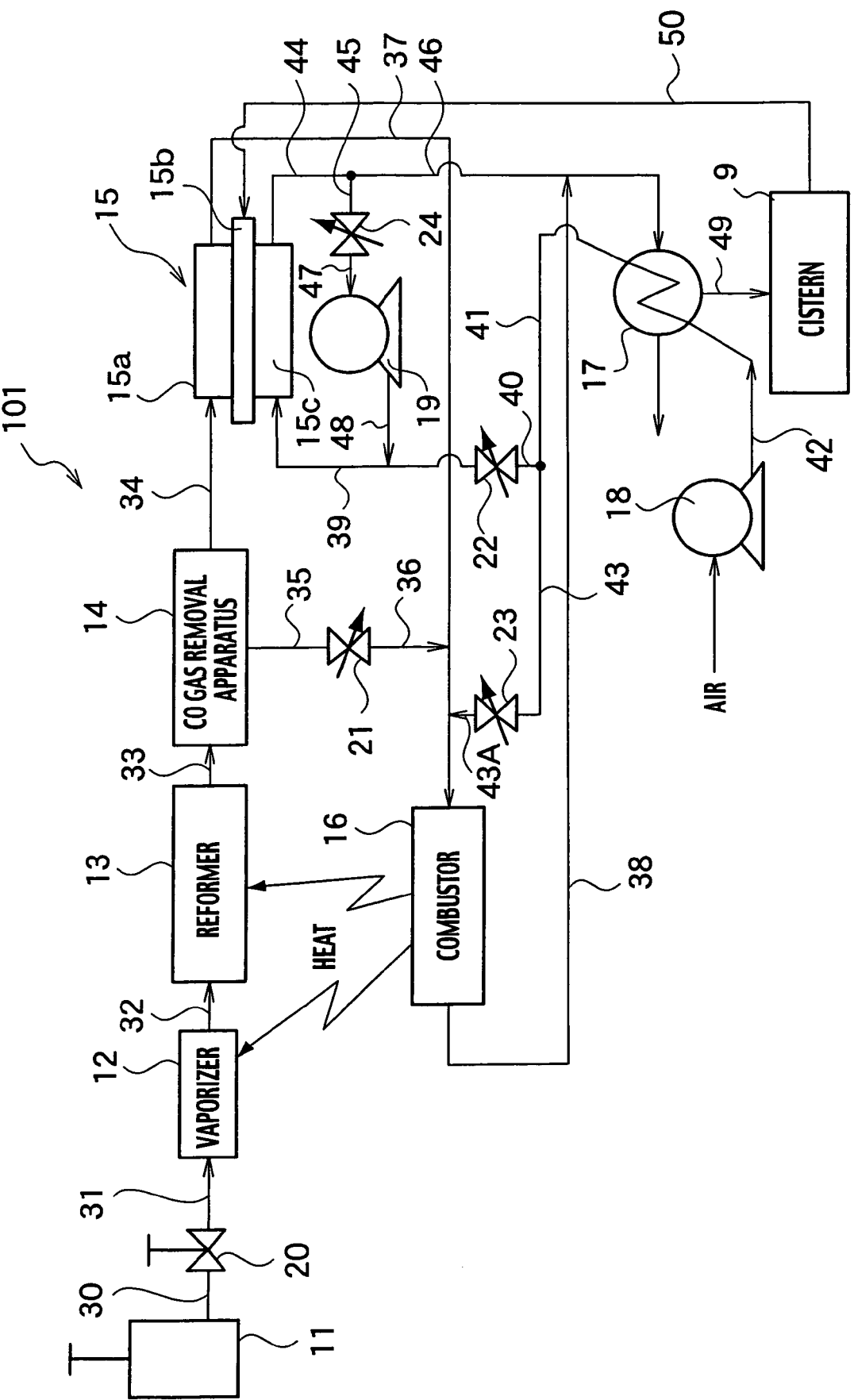
FIG. 1 is a block diagram showing an example of a fuel cell system according to a first embodiment of the present invention.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. However, it will be obvious to those skilled in the art that the present invention may be practiced without such specific details.

First Embodiment

As shown in FIG. 1, a fuel cell system 101 according to a first embodiment of the present invention includes a fuel tank 11 configured to store a fuel at a pressure higher than atmospheric pressure, a vaporizer 12 configured to vaporize the fuel, a reformer 13 configured to reform the vaporized fuel into hydrogen rich gas, a CO gas removal apparatus 14 configured to remove CO gas included in the hydrogen rich gas, and a cell unit 15 configured to generates electricity by allowing the hydrogen rich gas to react with oxygen. The cell unit 15 includes a fuel electrode 15a which introduces the hydrogen rich gas supplied from the reformer 13, an air electrode 15c which introduces the oxygen supplied from the pump 18, and a polymer film 15b interposed between the fuel electrode 15a and the air electrode 15c. The fuel electrode 15a includes an anode flow channel, an anode gas diffusion layer, and an anode catalytic layer. The air electrode 15c includes a cathode flow channel, a cathode gas diffusion layer, and a cathode catalytic layer.

A downstream side of the fuel tank 11, a variable conductance valve 20 which can adjust conductance is coupled via a pipe 30. The variable conductance valve 20 is coupled to the vaporizer 12 via a pipe 31, and the reformer 13 is coupled to an exit side of the vaporizer 12 via a pipe 32. To an exit side of the reformer 13, the CO gas removal apparatus 14 is coupled via a pipe 33. To an exit side of the CO gas removal apparatus 14, the fuel electrode 15a is coupled via a pipe 34. A variable conductance valve 21 is coupled to another exit side of the CO gas removal apparatus 14 via a pipe 35, and a pipe 36 is coupled to a downstream side of the variable conductance valve 21. To an exit side of the fuel electrode 15a, a pipe 37 is coupled. The pipe 37 is coupled to a combustor 16 which combusts exhaust gas in the fuel electrode 15a. A downstream side of the pipe 36 is coupled to the combustor 16 via this pipe 37. An exit side of the combustor 16 is coupled to a pipe 38 coupled to a heat exchanger 17 via a pipe 46. Gas discharged from the combustor 16 is introduced into the heat exchanger 17 via the pipes 38 and 46 and discharged to the outside.

A pipe 39 is coupled to an entry side of the air electrode 15c. A flow control valve 22 is coupled to an upstream side of the pipe 39, and a pipe 40 is coupled to an upstream side of the flow control valve 22. An upstream side of the pipe 40 is coupled to a pipe 41, and the heat exchanger 17 is coupled to an upstream side of this pipe 41. To an upstream side of the heat exchanger 17, the pump 18 for air suction is coupled via a pipe 42. Furthermore, the pipe 41 is coupled to a pipe 43 which branches off from a spot, to which the pipe 40 is coupled, toward its downstream side. A flow control valve 23 is coupled to the downstream side of the pipe 43, and a pipe 43 coupled to the pipe 37 is located in a downstream side of the flow control valve 23. Meanwhile, to an exit side of the air electrode 15c, a pipe 44 is coupled. To this pipe 44, a pipe 45 and the pipe 46 are coupled. A flow control valve 24 is coupled to a downstream side of the pipe 45, and a second pump 19 is coupled to the flow control valve 24 via a pipe 47. A pipe 48 coupled to the pipe 39 is coupled to a downstream side of the second pump 19. Meanwhile, a downstream side of the pipe 46 is coupled to the heat exchanger 17. The heat exchanger 17 is further coupled to a cistern 9 via a pipe 49, and a downstream side of the cistern 9 is coupled to the polymer film 15b via a pipe 50.

In the fuel tank 11, a fuel for supplying hydrogen to the cell unit 15 is stored. For the fuel, for example, a solution obtained by mixing dimethyl ether (DME) and water at a mole ratio of 1:6 and the like is agreeable. Instead of dimethyl ether, a mixed solution of diethyl ether and water may be used. The fuel is stored in the fuel tank 11 at a pressure higher than atmospheric pressure. As is well known, a saturated vapor pressure of DME at room temperature (25° C.) is about 6 atm, which is higher than atmospheric pressure. Thus, when the mixed solution of DME and water is stored as the fuel in the fuel tank 11 at room temperature, a saturated vapor pressure of about 4 atm may be maintained in the fuel tank 11.

The vaporizer 12 is a device which vaporizes liquid in the fuel by heating. The vaporizer 12 is heated, for example, by a heat source from the outside and the like from about 150° C. to 250° C. Moreover, the vaporizer 12 is pressurized to a pressure higher than atmospheric pressure by the saturated vapor pressure acting in the fuel tank 11. The fuel containing liquid such as water is vaporized by being heated by the vaporizer 12 and become gas fuel with a certain composition.

The reformer 13 is a device configured to allow the fuel vaporized in the vaporizer 12 to react with water vapor, and reforms the fuel to hydrogen rich gas. The inside of the reformer 13 is heated from about 300° C. to 400° C., desirably to about 350° C. Inside of the reformer 13 may be pressurized to a pressure higher than atmospheric pressure by the saturated vapor pressure acting in the fuel tank 11. In this reformer 13, catalysts carrying alumina ($Al_2O_3$) and rhodium (Rh) are filled as reforming catalysts. In the reformer 13 shown in FIG. 1, for example, as the following reaction proceeds, a hydrogen rich gas, in which some amount of CO is contained, is generated from the fuel.

$$CH_3OCH_3 + 3H_2O \rightarrow 2CO_2 + 6H_2 \quad (1)$$

The CO gas removal apparatus 14 is an apparatus which selectively removes carbon monoxide (CO) gas from the hydrogen rich gas generated in the reformer 13. A semipermeable membrane, which selectively filters out approximately only hydrogen, is located inside of the CO gas removal apparatus 14. As the semipermeable membrane, for example, silica containing semipermeable membrane may be agreeable. The silica containing semipermeable membrane is obtained by depositing a silica film having a thickness of about 0.2 μm on a deposited $\gamma$-$Al_2O_3$ film having a thickness of about 0.6 μm on an $\alpha$-$Al_2O_3$ board having a thickness of about 350 μm. In such a manner, when the semipermeable membrane is housed in the CO gas removal apparatus 14, the internal temperature thereof may be maintained at about 250° C. to 350° C. The CO gas removal apparatus 14 is maintained at a pressure higher than atmospheric pressure by the saturated vapor pressure acting in the fuel tank 11 and the backing pressure regulating valve 21. For example, a pressure inside the reformer 13 may be regulated by the backing pressure regulating valve 21 so as to be about 3 atm.

As the cell unit 15 including the fuel electrode 15a, the polymer film 15b and the air electrode 15c, a PEMFC is agreeable. In the cell unit 15, the fuel electrode 15a dissociates the hydrogen rich gas supplied from the CO gas removal apparatus 14 to hydrogen ions and electrons. The dissociated hydrogen ions pass through the proton exchange polymer film 15b and move to the air electrode 15c. Consequently, in the air electrode 15c, the hydrogen ions and electrons pass an outside circuit react with oxygen supplied through the pipe 39 and generate water. At that time, electricity is generated.

The combustor 16 is a device which catalytically combusts the exhaust gas which contains such as hydrogen supplied from the fuel electrode 15a, and both CO and hydrogen gases which have not passed the semipermeable membrane in the CO gas removal apparatus 14. In the combustor 16, catalysts such as Pt are filled. The combustor 16 is heated from about 300° C. to 400° C. Heat generated in the combustor 16 is transferred to the vaporizer 12, the reformer 13 and the CO gas removal apparatus 14 and is utilized for vaporization energy of the fuel, reaction energy for reforming and heating energy for of the semipermeable membrane. Combustion gas discharged from the combustor 16 is introduced to the heat exchanger 17 via the pipe 38 and the pipe 46 and condensed to water.

Next, with reference to FIG. 1, description will be given of a method for using the fuel cell system according to the first embodiment of the present invention.

First, while properly regulating conduction, the variable conductance valve 20 is opened. When the variable conductance valve 20 is opened, liquid fuel is actively supplied to the vaporizer 12 by the saturated vapor pressure acting in the fuel tank 11. Next, the liquid fuel is heated and vaporized in the vaporizer 12. The vaporized fuel is introduced into the reformer 13 via the pipe 32 at the exit side of the vaporizer 12.

Next, the reformer 13 reforms the vaporized fuel to hydrogen rich gas. For example, in the case of using a mixed solution of dimethyl ether and water as the fuel, the reaction of the equation (1) proceeds in the presence of reforming catalysts in the reformer 13, and the hydrogen rich gas, in which some amount of Co is contained, is generated. The generated hydrogen rich gas is supplied to the CO gas removal apparatus 14 via the pipe 33 at the exit side of the reformer 13.

Next, the CO gas removal apparatus 14 allows the hydrogen rich gas to contact a semipermeable membrane. Hydrogen in the hydrogen rich gas is selectively filtered by the semipermeable membrane and is supplied to the fuel electrode 15a as needed via the pipe 34. Meanwhile, gas such as CO, $CO_2$, $H_2$ and $H_2O$ which have not passed through the semipermeable membrane are supplied into the pipe 36 through the backing pressure regulating valve 21.

Next, the cell unit 15 generates electricity by allowing the hydrogen supplied to the fuel electrode 15a so as to react with the oxygen supplied to the air electrode 15c. The oxygen is supplied to the air electrode 15c by feeding air from the pump 18 from the pipe 42 via the heat exchanger 17, the pipes 41 and 40, the conductance control valve 22, and the pipe 39. A part of the gas discharged from the air electrode 15c is introduced into the pipe 45 from the pipe 44, introduced into the second pump 19 via the conductance control valve 24 and the pipe 47 and supplied to the air electrode 15c again via the pipe 39 from the second pump 19. Meanwhile, the gas which has not been circulated in the air electrode 15c is introduced into the heat exchanger 17 via the pipe 46 from the pipe 44 and stored in the cistern 9 after being condensed by the heat exchanger 17. Water stored in the cistern 9 is supplied to the polymer film 15b via the pipe 50. Meanwhile, the hydrogen gas discharged from the fuel electrode 15a is fed to the pipe 37.

Next, in the pipe 37, surplus hydrogen gas discharged from the fuel electrode 15a, and the gas which has not passed through the semipermeable membrane in the CO gas removal apparatus 14 is mixed with the air supplied from the pump 18 via the pipe 42, the heat exchanger 17, the pipes 41 and 43, the flow control valve 23 and the pipe 43A. Thereafter, the mixture is supplied to the combustor 16. The surplus hydrogen gas and the gas which has not passed through the semipermeable membrane are burned catalytically in the combustor 16. In this event, the heat generated in the combustor 16 is transferred to the vaporizer 12, the reformer 13 and the CO gas removal apparatus 14 and is utilized for vaporization energy of fuel, reaction energy for reforming and heating energy for the semipermeable membrane. Subsequently, the combustion gas discharged from the combustor 16 is introduced into the pipe 46 via the pipe 38 and introduced into the heat exchanger 17 from the pipe 46. The introduced combustion gas is cooled by the heat exchanger 17. Water generated in the heat exchanger 17 is stored in the cistern 9 via the pipe 49 and supplied to the polymer film 15b via the pipe 50.

As described above, the fuel cell system shown in FIG. 1 can be utilized. In the fuel cell system 101 according to the first embodiment of the present invention, the saturated vapor pressure of the fuel in the fuel tank 11 acts on the vaporizer 12, the reformer 13, the CO gas removal apparatus 14 and the fuel cell unit 15, respectively. Thus, a pump to supply fuel can be omitted and therefore power that would be required for a pump is not necessary. At the same time, the whole fuel cell system 101 can be miniaturized and simplified. Moreover, in the fuel cell system 101 shown in FIG. 1, the liquid fuel enclosed in the fuel tank 11 is vaporized by the vaporizer 12, and thereafter, introduced into the reformer 13. Thus, the gas with a certain composition can be stably supplied to the reformer 13, and the fuel can be stably reformed in the reformer 13. The upstream side of the semipermeable membrane is maintained at a pressure higher than atmospheric pressure by the backing pressure regulating valve 21, and thus, it is possible to promote hydrogen penetration speed per semipermeable membrane unit than the case of processing hydrogen under atmospheric pressure. Part of the gas containing vapor discharged from the air electrode 15c is supplied to the air electrode 15c again, and water generated by the power generation reaction can be used for moisturizing the polymer film 15b. Meanwhile, a part of the water accompanied by the gas which has not introduced to the air electrode 15c is also supplied to the polymer film 15b after being condensed to water by the heat exchanger 17 via the cistern 9 and the pipe 50. Thus, a moisture retention property of the polymer film 15b can be maintained in a suitable condition. Furthermore, when the fuel tank 11 is heated, the saturated vapor pressure of the fuel is increased. Thus, the ability to feed the fuel into the vaporizer 12 would be enhanced and the reformer 13 and CO gas removal apparatus 14 would be pressurized further.

Fist Modification of the First Embodiment

Figure 2:
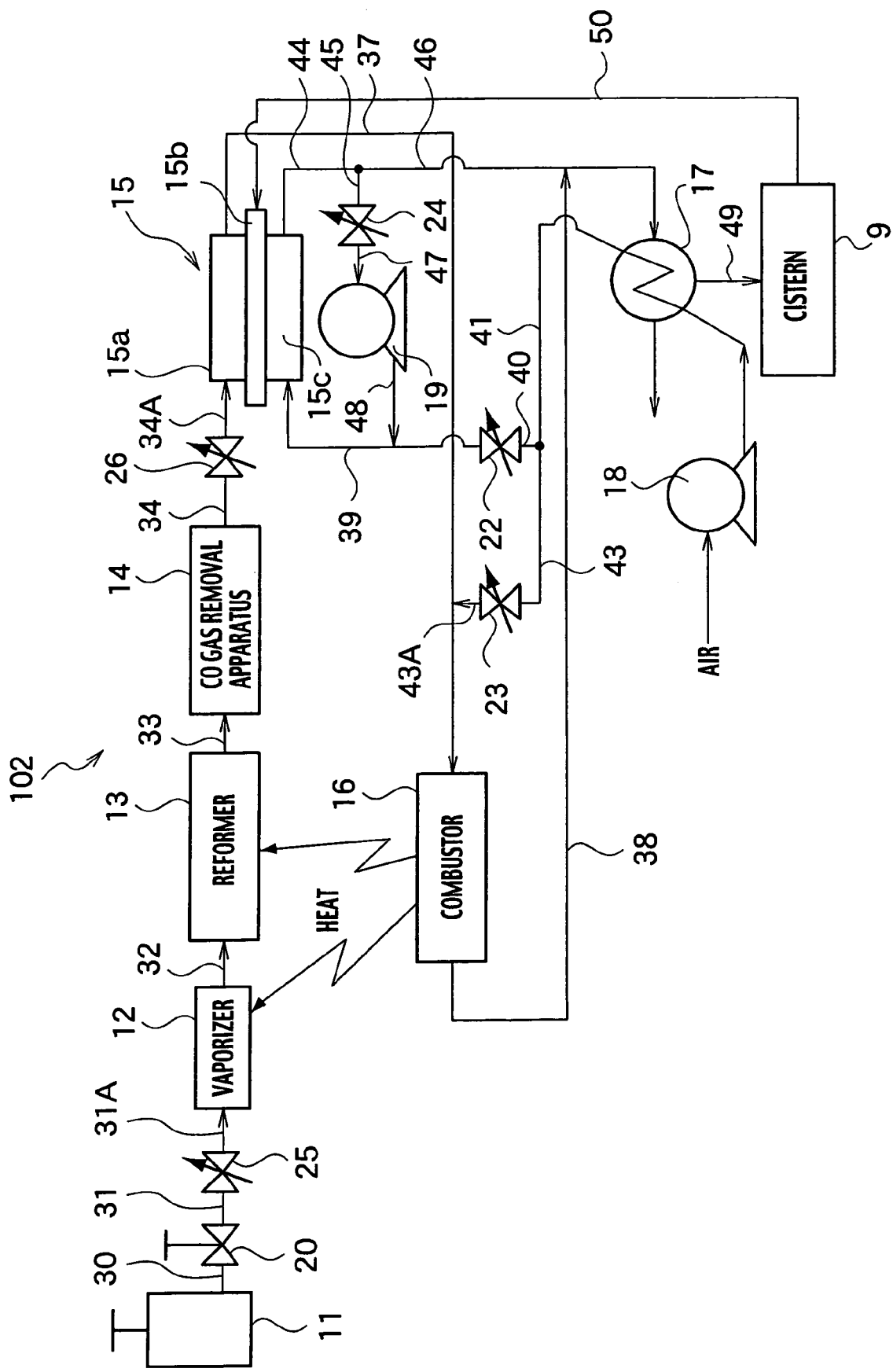
FIG. 2 is a block diagram showing a first modification of the first embodiment of the present invention.

As shown in FIG. 2, in a fuel cell system 102 according to a first modification of the first embodiment of the present invention, a conductance control valve 25 is interposed between the variable conductance valve 20 and the vaporizer 12. Moreover, a conductance control valve 26 is interposed between the CO gas removal apparatus 14 and the fuel cell unit 15. The conductance control valve 25 is coupled to a pipe 31A having its upstream side coupled to the pipe 31 and its downstream side coupled to the vaporizer 12. The conductance control valve 26 is coupled to a pipe 34A having its upstream side coupled to the pipe 34 and its downstream side coupled to the fuel electrode 15a. Points other than the above are approximately the same as those of the constitution shown in FIG. 1, and thus, description will be omitted.

The CO gas removal apparatus 14 shown in FIG. 2 houses a CO removal catalyst including a shift catalyst and a selective methanation catalyst to convert CO gas into the other gas such as $CO_2$, $H_2$, and methane. The shift catalyst converts CO into $CO_2$ and $H_2$ by reacting CO gas with vapor in the hydrogen rich gas. The selective methanation catalyst converts CO into methane by reacting CO gas with $H_2$ in the hydrogen rich gas. For the shift catalyst containing Cu—Zn and the like can be agreeable. For the selective methanation catalyst containing Ru and the like can be agreeable. In these cases, inside of the CO gas removal apparatus 14 is heated from about 200° C. to 300° C. desirably to about 250° C. In the CO gas removal apparatus 14, for example, in the presence of the catalyst such as Cu—Zn, the following reaction proceeds, $$CO + H_2O \rightarrow CO_2 + H_2 \qquad (2)$$

and, in the presence of the catalyst such as Ru, the following reaction proceeds.

$$CO + H_2 \rightarrow CH_4 + H_2O \qquad (3)$$

As a result, CO contained in the hydrogen rich gas is removed. The inside of the CO gas removal apparatus 14 is pressurized to a pressure higher than atmospheric pressure by a vapor pressure of the fuel tank 11 and is controlled to be about 3 atm by the conductance control valve 26.

Next, with reference to FIG. 2, description will be given of a method for using the fuel cell system according to the first modification of the first embodiment of the present invention.

First, while controlling a conductance by the conductance control valve 25, the variable conductance valve 20 is opened. The liquid fuel is introduced into the vaporizer 12 through the pipes 30, 31 and 31A by the saturated vapor pressure acting in the fuel tank 11, and becomes gas fuel. Next, the gas fuel is reformed to hydrogen rich gas in the reformer 13. For example, in the case of using a mixed solution of dimethyl ether and water as the fuel, the reaction of the equation (1) proceeds in the reformer 13, and thus, the hydrogen rich gas, in which some amount of CO is contained, is generated. Subsequently, the hydrogen rich gas generated in the reformer 13 is supplied to the CO gas removal apparatus 14 via the pipe 33 at the exit side of the reformer 13.

Next, in the CO gas removal apparatus 14, CO gas in the hydrogen rich gas is removed by use of the CO removal catalyst. In the CO gas removal apparatus 14, the reaction of the equation (2) may proceed by use of the shift catalyst containing such as Cu—Zn. Furthermore, the reaction of the equation (3) may proceed by use of the selective methanation catalyst containing such as Ru. Then, CO in the hydrogen rich gas can be reduced to 10 ppm or less. Subsequently, the hydrogen rich gas from which CO gas is reduced to 10 ppm or less is introduced into the pipe 34 and into the fuel electrode 15a via the pipe 34A while controlling the conductance by the conductance control valve 26. Points other than the above are similar to those of the method for using the fuel cell system 101 shown in FIG. 1, and thus, description will be omitted.

As described above, the fuel cell system 102 shown in FIG. 2 can be utilized. In the fuel cell system 102 according to the first modification of the first embodiment of the present invention, the saturated vapor pressure of the fuel itself contained in the fuel tank 11 pushes the fuel to flow into the vaporizer 12. Thus, a pump to supply fuel can be omitted and, at the same time, the whole fuel cell system 102 can be miniaturized and simplified. Moreover, in the fuel cell system 102 shown in FIG. 2, the liquid fuel is vaporized by the vaporizer 12 and thereafter introduced into the reformer 13. Thus, the gas with a certain composition can be stably supplied to the reformer 13, and the fuel can be reformed to the hydrogen rich gas in a suitable condition. Furthermore, the CO gas removal apparatus 14 is pressurized to about 3 atm, which is higher than atmospheric pressure, by a conductance control valve 34A. Thus, volumes of the reformer 13 and the CO gas removal apparatus 14 can be reduced. Furthermore, part of the gas containing vapor discharged from the air electrode 15c is suctioned by the pump 19 and supplied to the pipe 39 via the pipe 48 again, and water generated by the power generation reaction can be used for moisturizing the polymer film 15b. The rest of the gas which has not introduced to the pump 19 is introduced to the polymer film 15b after being cooled and condensed to the water by the heat exchanger 17, and the moisture retention property of the polymer film 15b can be maintained in a suitable condition.

Example of the Fist Modification

Figure 3:
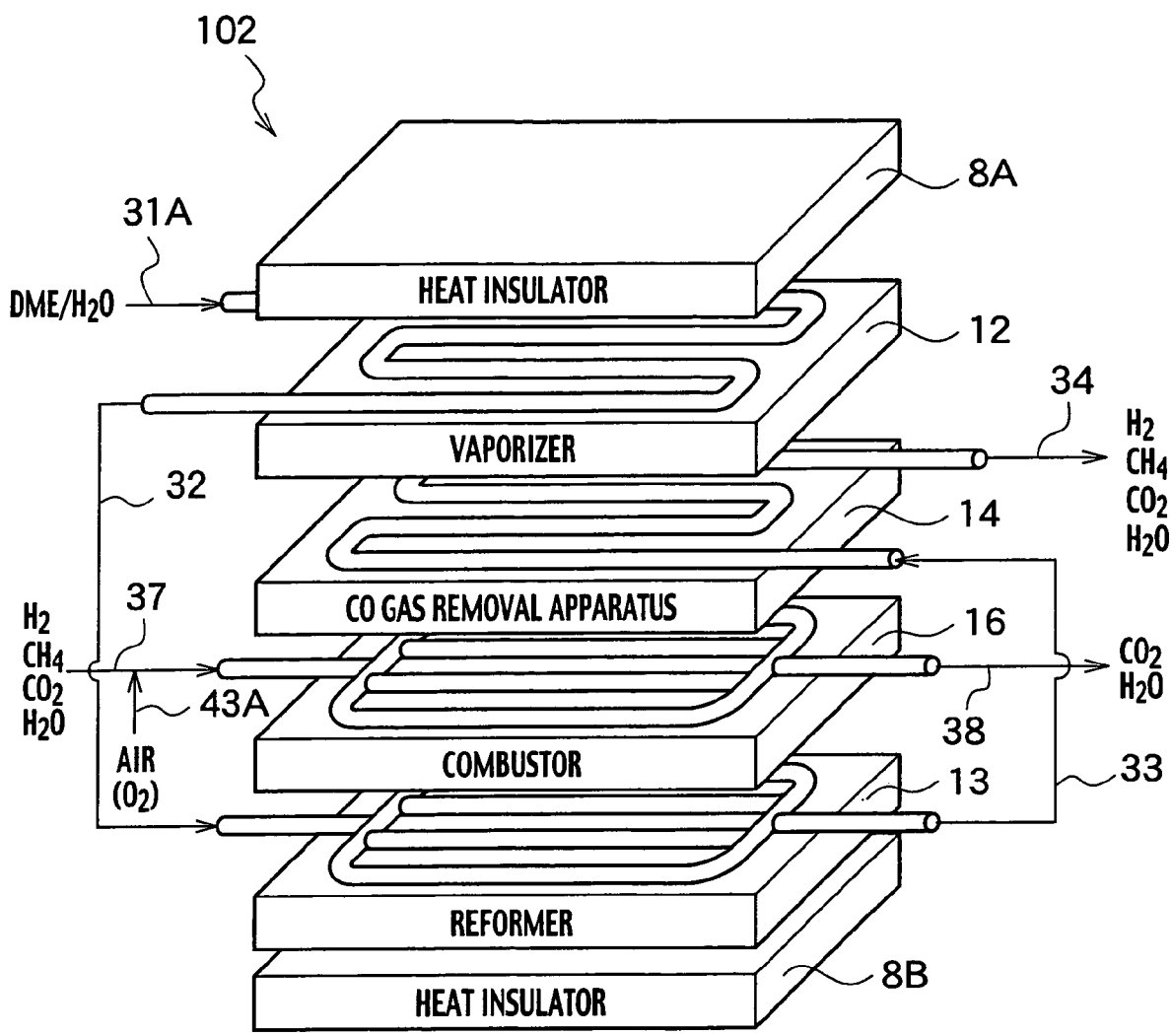
FIG. 3 is a schematic drawing showing an example of the arrangement shown in FIG. 2.

As shown in FIG. 3, in the fuel cell system 102 according to an example of the first modification of the first embodiment of the present invention, the vaporizer 12 is located under a heat insulator 8A. The CO gas removal apparatus 14 is located under the vaporizer 12, and the combustor 16 is located under the CO gas removal apparatus 14. The reformer 13 is located under the combustor 16, and a heat insulator 8B is located under the reformer 13. According to the fuel cell system 102 shown in FIG. 3, the CO gas removal apparatus 14 in which an exothermic reaction proceeds is located under the vaporizer 12 in which an endothermic reaction proceeds, and the reformer 13 in which the endothermic reaction proceeds is located under the combustor 16 in which the exothermic reaction proceeds. Thus, thermal efficiency can be further improved.

Second Modification of the First Embodiment

Figure 4:
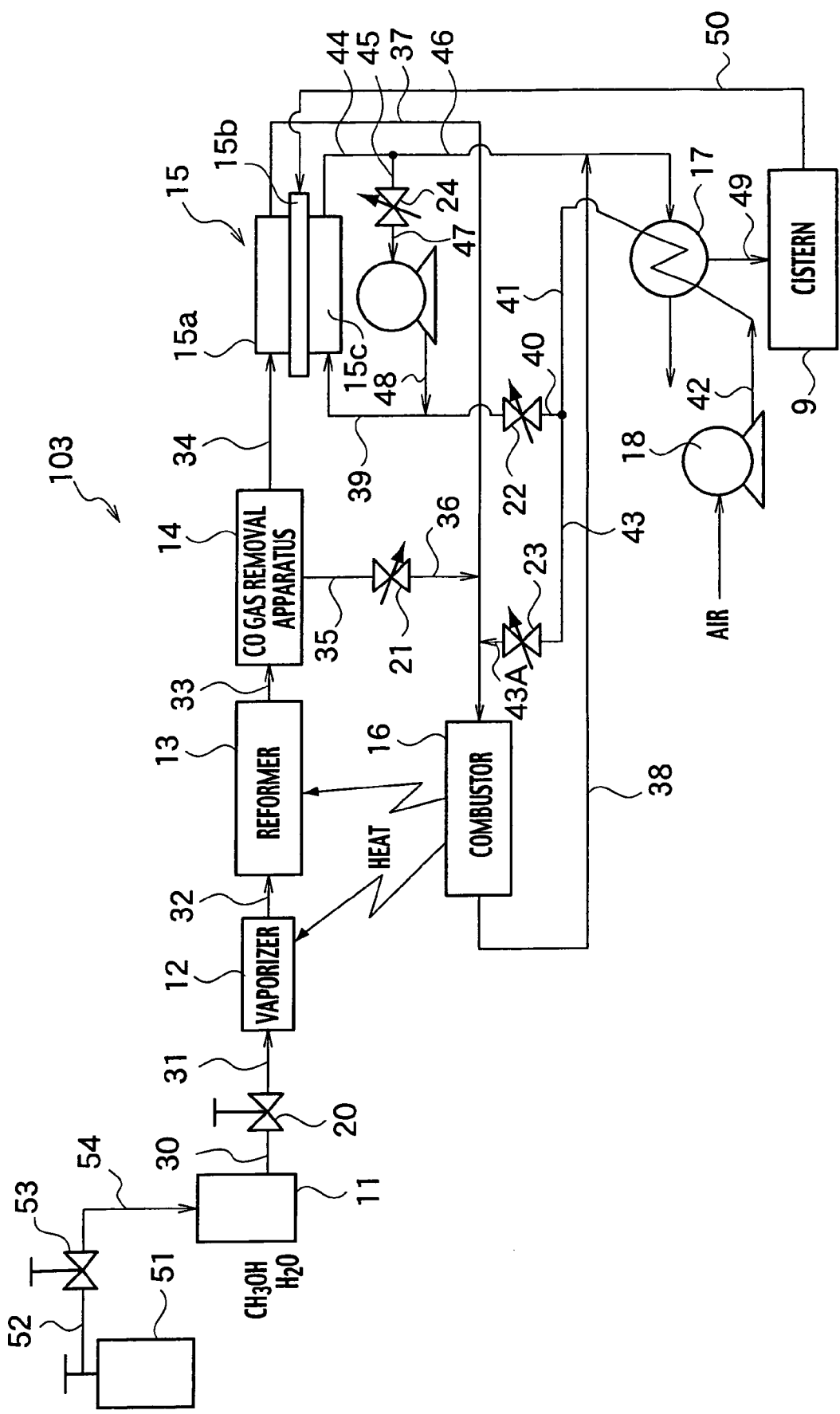
FIG. 4 is a block diagram showing a second modification of the first embodiment of the present invention.

As shown in FIG. 4, a fuel cell system 103 according to a second modification of the first embodiment of the present invention further includes a variable conductance valve 53 coupled to an upstream side of the fuel tank 11 via a pipe 54, and a pressurized tank 51 coupled to an upstream side of the variable conductance valve 53 via a pipe 52. Points other than the above are approximately the same as those of the fuel cell system 101 shown in FIG. 1, and thus, detailed description thereof will be omitted.

The fuel tank 11 contains a solution of methanol and water as a fuel. Ethanol can be used instead of methanol. Note that the saturated vapor pressure of these alcohols is lower than atmospheric pressure at room temperature. Consequently, pressure acting on the pressurized tank 51 coupled to the upstream side of the fuel tank 11 pushes the liquid fuel out to the vaporizer 12. In the pressurized tank 51, for example, nitrogen and the like gas can be filled.

Next, with reference to FIG. 4, description will be given of a method for using the fuel cell system according to the second modification of the first embodiment of the present invention.

First, the variable conductance valve 53 is opened, and gas filled in the pressurized tank 51 is supplied to the fuel tank 11 via the pipes 52 and 54. The fuel tank 11 is pressurized by the gas supplied from the pressurized tank 51. Next, the variable conductance valve 20 which can adjust conductance is opened, and fuel is supplied to the vaporizer 12 by the pressure acting on the fuel tank 11. The method after supplying the fuel to the vaporizer 12 is similar to that of the fuel cell system 101 shown in FIG. 1, and thus, description will be omitted.

According to the fuel cell system 103 shown in FIG. 4, the pressure of the pressurized gas filled in the pressurized tank 51 pushes fuel in the fuel tank 11 to flow into the vaporizer 12. Thus, a pump to supply the fuel can be omitted, and, at the same time, the whole fuel cell system 103 can be miniaturized and simplified. Moreover, in the fuel cell system 103 shown in FIG. 4, the liquid fuel is vaporized by the vaporizer 12 and thereafter introduced into the reformer 13. Thus, the gas with a certain composition can be stably supplied to the reformer 13, and the fuel can be reformed to the hydrogen rich gas in a suitable condition. Note that a semipermeable membrane is adopted as the CO gas removal apparatus 14 in FIG. 4. However, such a CO removal catalyst including a shift catalyst and a selective methanation catalyst as shown in FIG. 2 is also adoptable.

Second Embodiment

Figure 5:
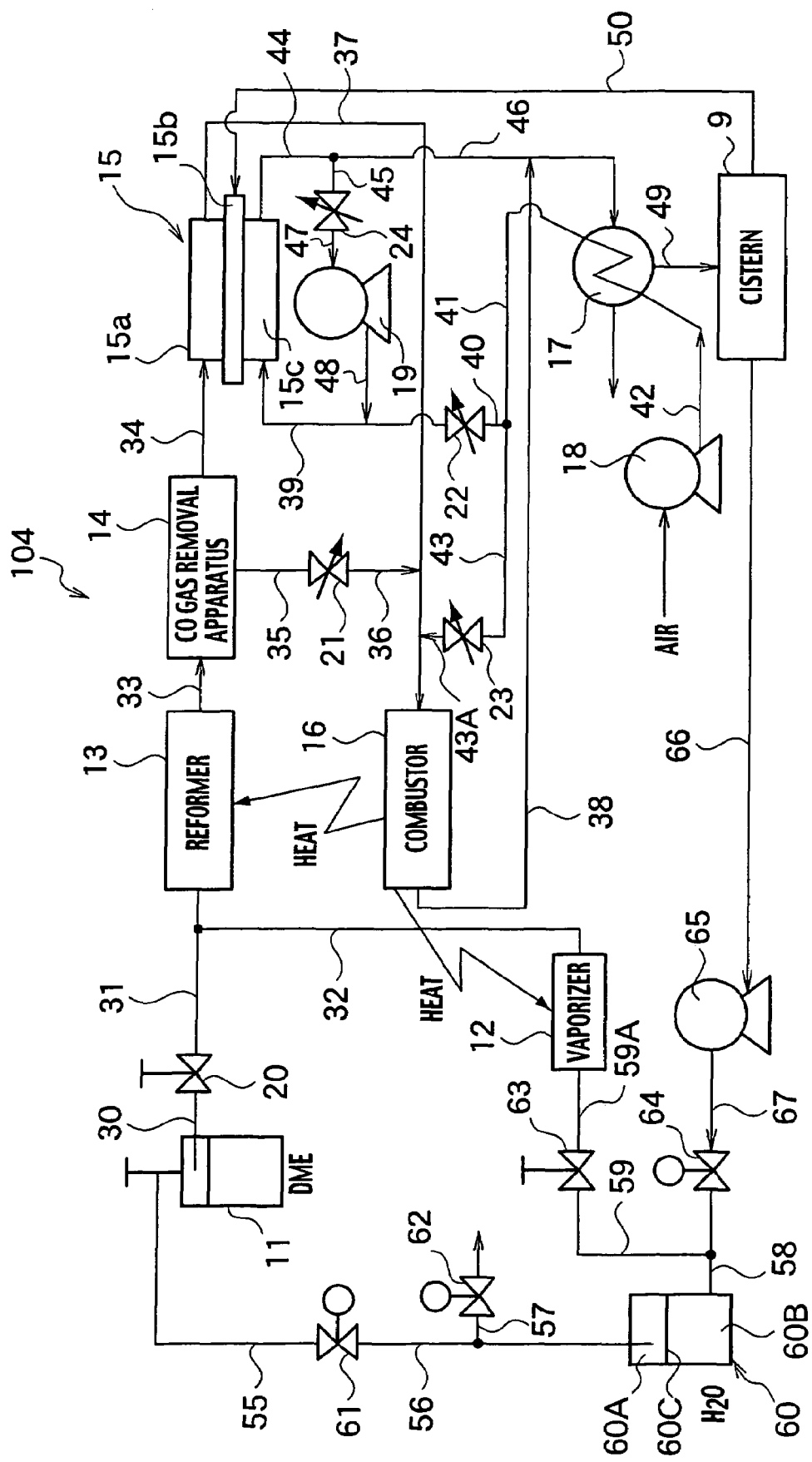
FIG. 5 is a block diagram showing an example of a fuel cell system according to a second embodiment of the present invention.

As shown in FIG. 5, a fuel cell system 104 according to a second embodiment of the present invention includes a fuel tank 11 configured to store a fuel at a pressure higher than atmospheric pressure, a reformer 13 configured to reform the fuel to hydrogen rich gas, a water tank 60 configured to stores water to be supplied to the reformer 13 being coupled to the fuel tank 11, a vaporizer 12 configured to vaporize the water in the water tank 60, a CO gas removal apparatus 14 configured to remove CO gas in the hydrogen rich gas, a cell unit 15 configured to generate electricity by allowing the hydrogen rich gas to react with oxygen.

In the fuel tank 11, liquid DME can be contained as the fuel. A saturated vapor pressure of DME at room temperature is about 6 atm. Thus, a saturated vapor pressure of about 6 atm always may be maintained in the fuel tank 11. The water tank 60 is separated into a first chamber 60A and a second chamber 60B, for example, by use of a movable partition 60C such as a piston and a diaphragm. A gas is filled in the first chamber 60A, and water is contained in the second chamber 60B. An upper part of the first chamber 60A is coupled to a variable conductance valve 61 via a pipe 56. Moreover, the pipe 56 is coupled to a variable conductance valve 62, which is freely released to the atmosphere, via a pipe 57. An upstream side of the variable conductance valve 61 is coupled to an upper part of the fuel tank 11 via a pipe 55. Meanwhile, a lower part of the second chamber 60B is coupled to a variable conductance valve 64 via a pipe 58. The variable conductance valve 64 is coupled to a third pump 65 via a pipe 67. Moreover, the pipe 58 is coupled to a variable conductance valve 63 via a pipe 59. The variable conductance valve 63 is coupled to the vaporizer 12 via a pipe 59A and is coupled to the reformer 13 via a pipe 32 coupled to a downstream of the vaporizer 12 and a pipe 31 coupled to the pipe 32. Points other than the above are approximately the same as those of the fuel cell system 101 shown in FIG. 1, and thus, description thereof will be omitted.

Next, with reference to FIG. 5, description will be given of a method for using the fuel cell system according to the second embodiment of the present invention.

First, the variable conductance valve 20 which can adjust conductantance, variable conductance valves 62 and 64 are closed, and the variable conductance valves 61 and 63 are opened. The fuel tank 11 contains the fuel (DME) which has a saturated vapor pressure higher than atmospheric pressure at room temperature. Thus, when the variable conductance valve 61 is opened, the saturated vapor pressure of the fuel, which acts in the fuel tank 11, acts on the first chamber 60A via the pipe 56 from the pipe 55. The partition 60C of the water tank 60 pressurizes from the first chamber 60A side to the second chamber 60B side. The water in the second chamber 60B is introduced into the vaporizer 12 through the pipe 58, the variable conductance valve which can adjust conductance 63 and the pipe 59.

Next, in the vaporizer 12, the water introduced from the second chamber 60B is heated and vaporized. The vaporized water is introduced into the pipe 31 from the pipe 32 as water vapor. Subsequently, the variable conductance valve 20 which can adjust conductance is opened in a state where the variable conductance valve 63 which can adjust conductance is opened, the fuel in the fuel tank 11 are fed into the pipe 31 while controlling the conductance, and the fuel is mixed with the water vapor. In this event, a mixture ratio of DME as the fuel to the water vapor is controlled by the variable conductance valves 20 and 63 so as to be a mole ratio of 1:4.

Next, the fuels and the water vapor are introduced into the reformer 13 from the pipe 31. In the reformer 13, by proceeding the reaction of (1) by use of Cu—Zn catalysts, hydrogen rich gas is generated. Subsequently, the hydrogen rich gas in the reformer 13 is supplied to the CO gas removal apparatus 14 via the pipe 33. The method after the above is approximately the same as the method for using the fuel cell system shown in FIG. 1. Note that, in FIG. 5, when the water level in the second chamber 60B of the water tank 60 is low, the variable conductance valves 61 and 63 are closed and the variable conductance valve 62 is opened. Then, pressure in the first chamber 60A may be equal to atmospheric pressure. After that, the variable conductance valve 64 is opened and water stored in the cistern 9 is supplied to the second chamber 60B from the pipe 66 via the pump 65 and the pipes 67 and 68. Finally, the variable conductance valves 62 and 64 are closed.

As described above, the fuel cell system shown in FIG. 5 can be utilized. In the fuel cell system 104 according to the second embodiment of the present invention, by the saturated vapor pressure of the fuel which acts in the fuel tank 11, the fuel and the water in the second chamber 60B are actively introduced into the reformer 13. Thus, a pump required to supply the fuel can be omitted, and, at the same time, the whole fuel cell system 104 can be miniaturized and simplified. Moreover, the upstream side of the semipermeable membrane, that is, the CO gas removal apparatus 14 is maintained at a pressure higher than atmospheric pressure by the backing pressure regulating valve 21. Thus, it may be possible to have a large hydrogen penetration speed per semipermeable membrane unit than in the case of processing hydrogen under atmospheric pressure and the volumes of the reformer 13 and the CO gas removal apparatus 14 can be reduced. Furthermore, water condensed at the heat exchanger 17 can be used for the reforming reaction, water prepared for the reforming reaction will be reduced.

First Modification of the Second Embodiment

Figure 6:
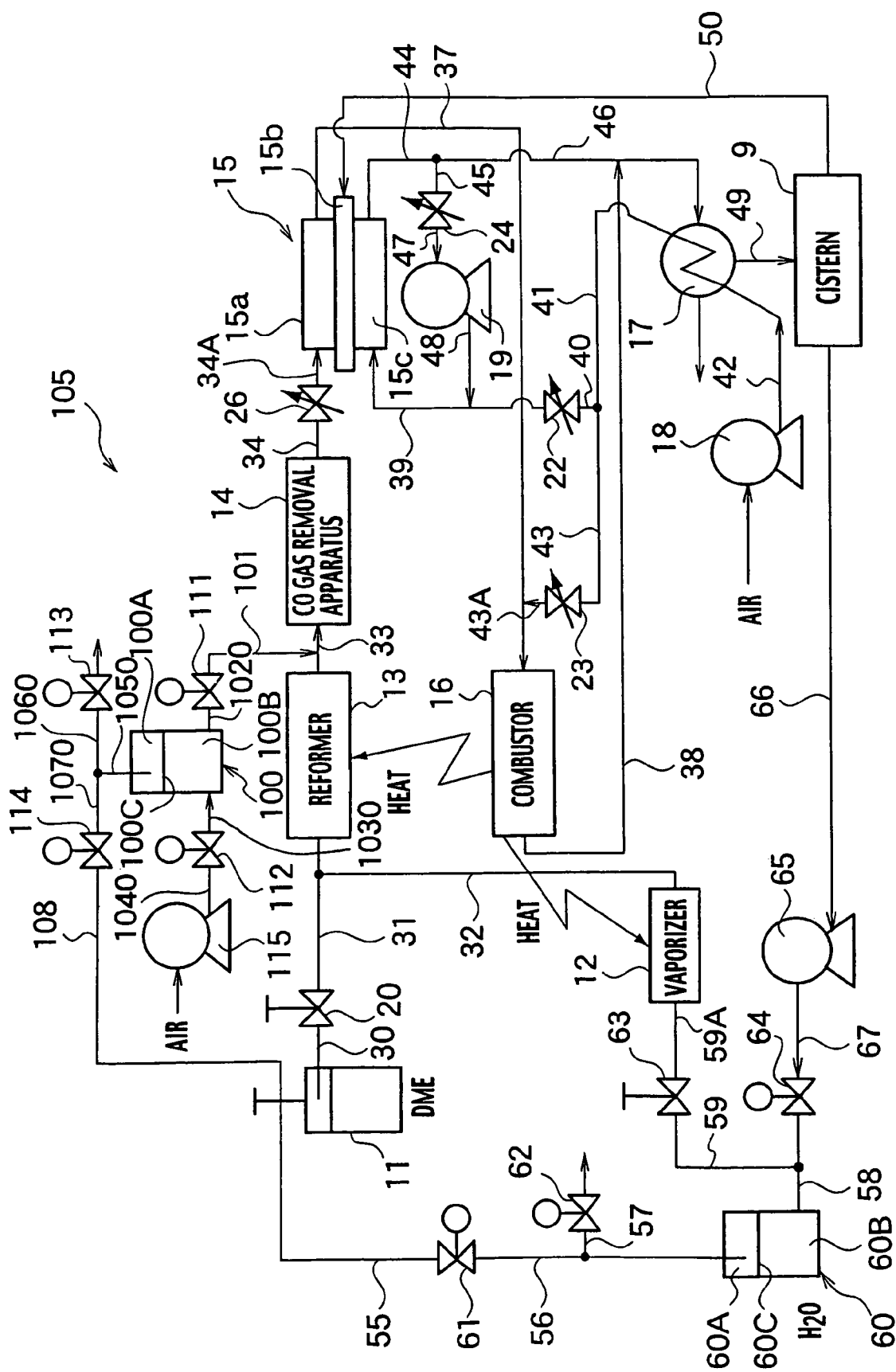
FIG. 6 is a block diagram showing a first modification of the second embodiment of the present invention.

As shown in FIG. 6, in a fuel cell system 105 according to a first modification of the second embodiment of the present invention, an air tank 100 is coupled to an upstream side of the CO gas removal apparatus 14. The air tank 100 is separated into a first chamber 100A and a second chamber 100B by use of a partition 100C. For the partition 100C, a piston and a diaphragm can be used. The first chamber 100 houses a gas and the second chamber 100B houses air therein. A pipe 1020 is coupled to a side of a lower part of the second chamber 100B. The pipe 1020 is coupled to a variable conductance valve 111 at its downstream side and a pipe 1020 coupled to a pipe 33 is coupled to a downstream side of the variable conductance valve 111. A pipe 1030 is coupled to the other side of the lower part of the second chamber 100B, which is opposite to the side coupled to the pipe 1020. A variable conductance valve 112 is coupled to an upstream side of the pipe 1030, and a fourth pump 115 is coupled to an upstream side of the variable conductance valve 112 via a pipe 1040. The fourth pump 115 pumps air from the outside. A pipe 1050 is coupled to an upper part of the first chamber 100A. The pipe 1050 branches off to be pipes 1060 and 1070. At a downstream side of the pipe 1060, a variable conductance valve 113 releasable to the atmosphere is located. An upstream side of the pipe 1070 is coupled to a pipe 108 via a variable conductance valve 114. The pipe 108 is coupled to the upside of the fuel tank 11. Note that, in FIG. 6, CO gas removal catalyst such as the partial oxidation catalyst for removing CO gas in hydrogen rich gas by contacting with oxygen is housed in the CO gas removal apparatus 14. Between a pipe 34 coupled to an exit side of the CO gas removal apparatus 14 and a pipe 34A coupled to an entry side of the fuel electrode 15a, a conductance control valve 26 is coupled. Points other than the above are approximately the same as those of the fuel cell system 104 shown in FIG. 5, and thus, description thereof will be omitted.

Next, with reference to FIG. 6, description will be given of a method for using the fuel cell system according to the fifth embodiment of the present invention.

First, the variable conductance valves 20, 62 to 64, 112 and 113 are closed, and the variable conductance valves 61, 63, 114 and 111 are opened. Accordingly, the fuel (DME) is actively supplied to the pipes 55 and 108 by the saturated vapor pressure of the fuel contained in the fuel tank 11. The fuel supplied to the pipe 108 is supplied to the first chamber 100A through the variable conductance valve 114 and the pipes 107σ and 105σ. The partition 100C is moved and pressurized to the second chamber 100B by the fuel pressure acting on the first chamber 100A. As a result, the air in the second chamber 100B is pushed out to the pipe 102σ. Meanwhile, the fuel supplied to the pipe 55 is supplied to the first chamber 60A through the variable conductance valve 61 and the pipe 56. The partition 60C is pushed to the second chamber 60B side by the fuel pressure acting on the first chamber 60A. As a result, the water in the second chamber 60B is introduced into the vaporizer 12 through the pipes 58 and 59 and the variable conductance valve 63. The water introduced into the vaporizer 12 becomes water vapor and is introduced into the reformer 13 through the pipes 32 and 31. Subsequently, the variable conductance valves 63 and 20 are opened, the fuel in the fuel tank 11 is supplied to the pipe 31 while controlling the conductance, and the fuel is mixed with the water vapor. In this event, a mixture ratio of DME as the fuel to the water vapor is controlled by the variable conductance valves 20 and 63 so as to be a mole ratio of 1:4. Next, the fuel and the water vapor are introduced into the reformer 13 from the pipe 31. In the reformer 13, by proceeding the reaction of the equation (1) by use of Cu—Zn catalyst, hydrogen rich gas, in which some amount of CO is contained, is generated. Subsequently, the hydrogen rich gas obtained in the reformer 13 is supplied to the pipe 33. The hydrogen rich gas supplied from the reformer 13 and the air are mixed and supplied to the CO gas removal apparatus 14. Note that, in order to return the partition 100C pushed to the second chamber side to its initial position, the air may be supplied from the fourth pump 115 into the second chamber 100B in the state where the variable conductance valves 111 and 114 are closed and the variable conductance valves 112 and 113 are opened. The CO gas removal apparatus 14 houses a partial combustion catalyst to oxidize CO to $CO_2$. The method after the above is approximately the same as the method for using the fuel cell system 104 shown in FIG. 5.

As described above, the fuel cell system shown in FIG. 6 can be utilized. In the fuel cell system 105 according to the first modification of the second embodiment of the present invention, the air required for performing CO oxidation utilizing the partial combustion catalyst in the CO gas removal apparatus 14 can be supplied to the pressurized area without using a pump, and thus, no noise is generated. Moreover, the whole fuel cell system 105 can be miniaturized and simplified.

Second Modification of the Second Embodiment

Figure 7:
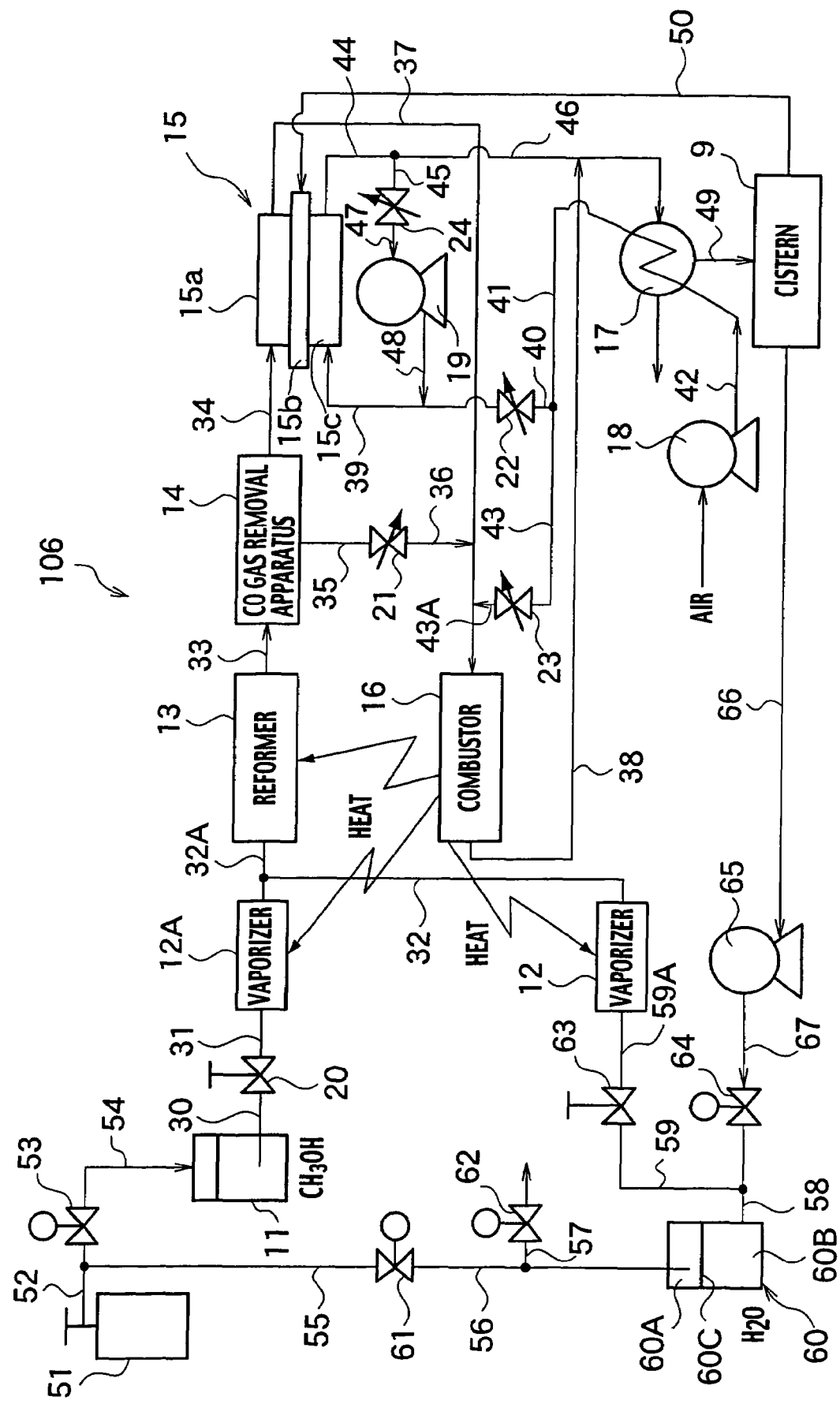
FIG. 7 is a block diagram showing a second modification of the second embodiment of the present invention.

As shown in FIG. 7, a fuel cell system 106 according to a second modification of the second embodiment of the present invention further includes a variable conductance valve 53 coupled to an upstream side of the fuel tank 11 via a pipe 54, and a pressurized tank 51 coupled to an upstream side of the variable conductance valve 53 via a pipe 52. A pipe 55 is coupled to the pipe 52. Points other than the above are approximately the same as those of the fuel cell system 104 shown in FIG. 5.

In the fuel tank 11, methanol is contained as the fuel. Ethanol may be used instead of methanol. A saturated vapor pressure of these alcohols is lower than atmospheric pressure at room temperature. Consequently, pressure acting on the pressurized tank 51 coupled to the upstream side of the fuel tank 11 pushes out the fuel toward the vaporizer 12A. In the pressurized tank 51, for example, nitrogen gas can be filled.

According to the fuel cell system 106 shown in FIG. 7, the pressure of the pressurized gas filled in the pressurized tank 51 pushes the fuel housed in the fuel tank 11 to flow into the vaporizer 12. Thus, a pump required to supply the fuel can be omitted, and, at the same time, the whole fuel cell system 106 can be miniaturized and simplified.

Third Modification of the Second Embodiment

Figure 8:
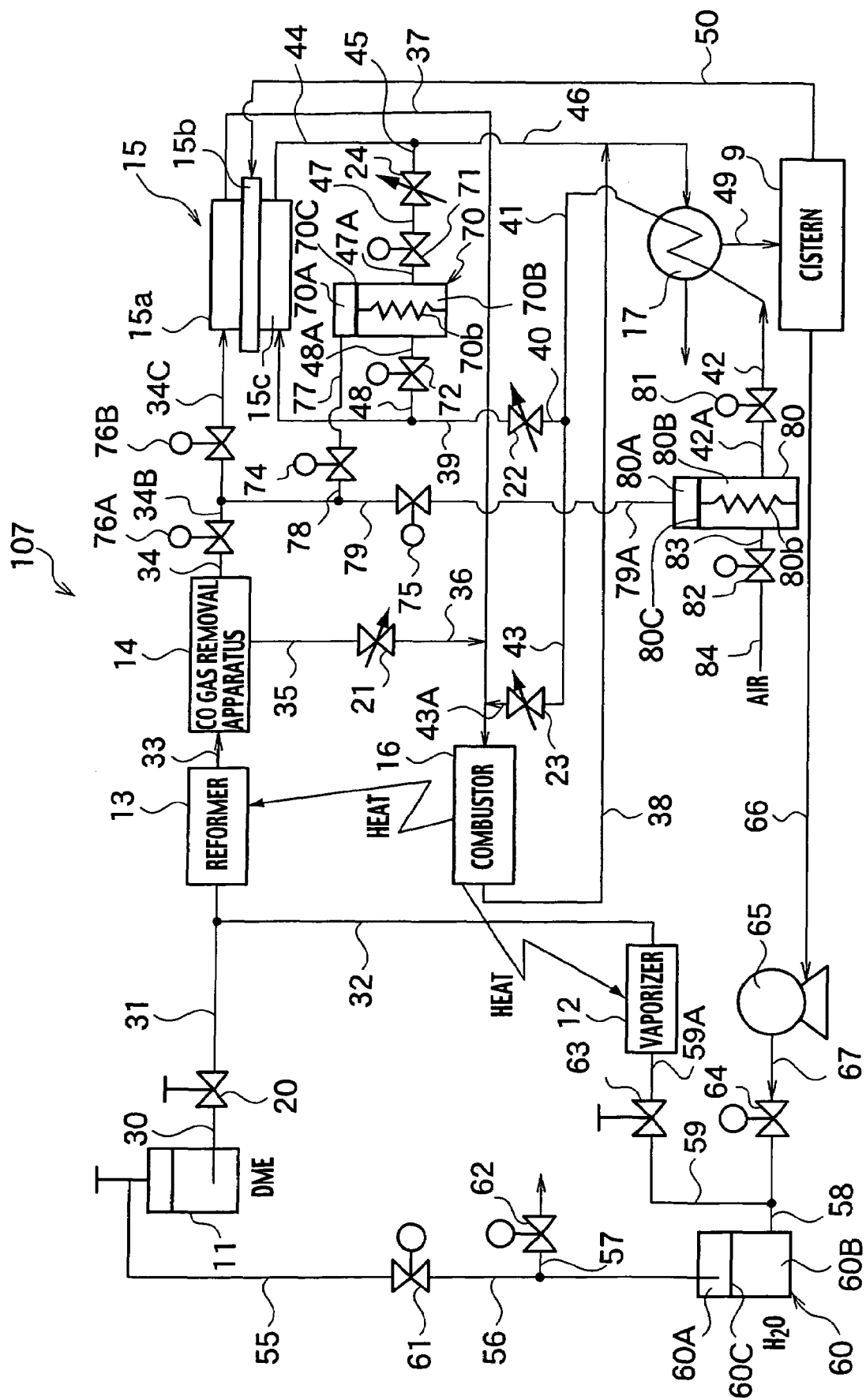
FIG. 8 is a block diagram showing a third modification of the second embodiment of the present invention.

As shown in FIG. 8, the fuel cell system 107 according to the third modification of the second embodiment of the present invention, a first oxygen supply unit 80 is located in place of the first pump 18 shown in FIG. 5, and a second oxygen supply unit 70 is located in place of the second pump 19.

The first oxygen supply unit 80 is separated into a first chamber 80A and a second chamber 80B by use of a movable partition 80C such as a piston and a diaphragm. An elastic member 80b coupled to a bottom of the second chamber 80B and the partition 80C is located inside of the second chamber 80B. As the elastic member 80b, for example, a spring or the like can be used. A pipe 79A is coupled to an upper part of the first chamber 80A, and a variable conductance valve 75 is coupled to an upstream side of the pipe 79A. The variable conductance valve 75 is coupled to a pipe 34B interposed between the CO gas removal apparatus 14 and the cell unit 15. The pipe 34B is coupled to a variable conductance valve 76A at its upstream side and is coupled to the CO gas removal apparatus 14 via a pipe 34. A variable conductance valve 76B is coupled to a downstream side of the pipe 34B and is coupled to the fuel electrode 15a via a pipe 34C coupled to the variable conductance valve 76B.

The second oxygen supply unit 70 is separated into a first chamber 70A and a second chamber 70B by use of a movable partition 70C such as a piston and a diaphragm. Inside of the second chamber 70B, an elastic member 70b coupled to the second chamber 70B and the partition 70C, such as a spring, is located. A pipe 77 is coupled to an upper part of the first chamber 70A, and is coupled to a variable conductance valve 74 coupled to an upstream side of the pipe 77. The variable conductance valve 74 is coupled to a pipe 79 via a pipe 78. A pipe 47 coupled to a variable conductance valve 71 is coupled to a side of the second chamber 70B. The variable conductance valve 71 is coupled to a conductance control valve 24 via the pipe 47A. At a side opposite to the side where the variable conductance valve 71 is located, a variable conductance valve 72 is located via a pipe 48A. The variable conductance valve 72 is coupled to a pipe 39 via a pipe 48.

Next, with reference to FIG. 8, description will be given of a method for using the fuel cell system 107 according to the modification 3 of the second embodiment of the present invention. Note that the procedures up to supplying of fuel from the CO gas removal apparatus 14 to the pipe 34 are similar to those of the fuel cell system 104 shown in FIG. 5, and thus, description thereof will be omitted.

The variable conductance valves 71, 72, 76B, 81 and 82 are closed, and the variable conductance valves 74, 75 and 76A are opened. Accordingly, by a saturated vapor pressure of fuel (DME) in the fuel tank 11, hydrogen rich gas is actively supplied to the pipe 34, the variable conductance valve 76A and the pipes 34B and 79. The hydrogen rich gas supplied to the first chamber 70A from the pipe 79 through the variable conductance valve 74 and the pipe 77 pushes the partition 70C toward the second chamber 70B. As a result, the gas contained in the second chamber 70B is supplied to the pipes 47A and 48A. Meanwhile, the hydrogen rich gas from the pipe 79 through the variable conductance valve 75 and the pipe 79A is supplied to the first chamber 80A. As a result, the partition 80C is pushed toward the second chamber 80B side, and thus, the air in the second chamber 80B is supplied to the pipes 42A and 83. Next, the variable conductance valve 75 is closed, and the variable conductance valve 76B is opened. The hydrogen rich gas is supplied to the fuel electrode 15a through the pipe 34, the variable conductance valve 76A, and the pipes 34B, 76B and 34C. Subsequently, the variable conductance valve 81 is opened. The air supplied to the pipe 42 is supplied to the air electrode 15c through the variable conductance valve 81, the pipe 42, the heat exchanger 17, and the pipes 41, 40 and 39. In this event, by closing the variable conductance valve 74 and opening the variable conductance valve 72, the gas supplied to the pipe 48A is supplied to the air electrode 15c via the pipes 48 and 39. Points other than the above are similar to those of the fuel cell system 104 shown in FIG. 5.

According to the fuel cell system 107 shown in FIG. 8, fuel and oxygen can be supplied without using a liquid feeding pump or an air pump, and thus, no noise is generated and the device can be also miniaturized and simplified.

First Example of the Third Modification

Figure 9:
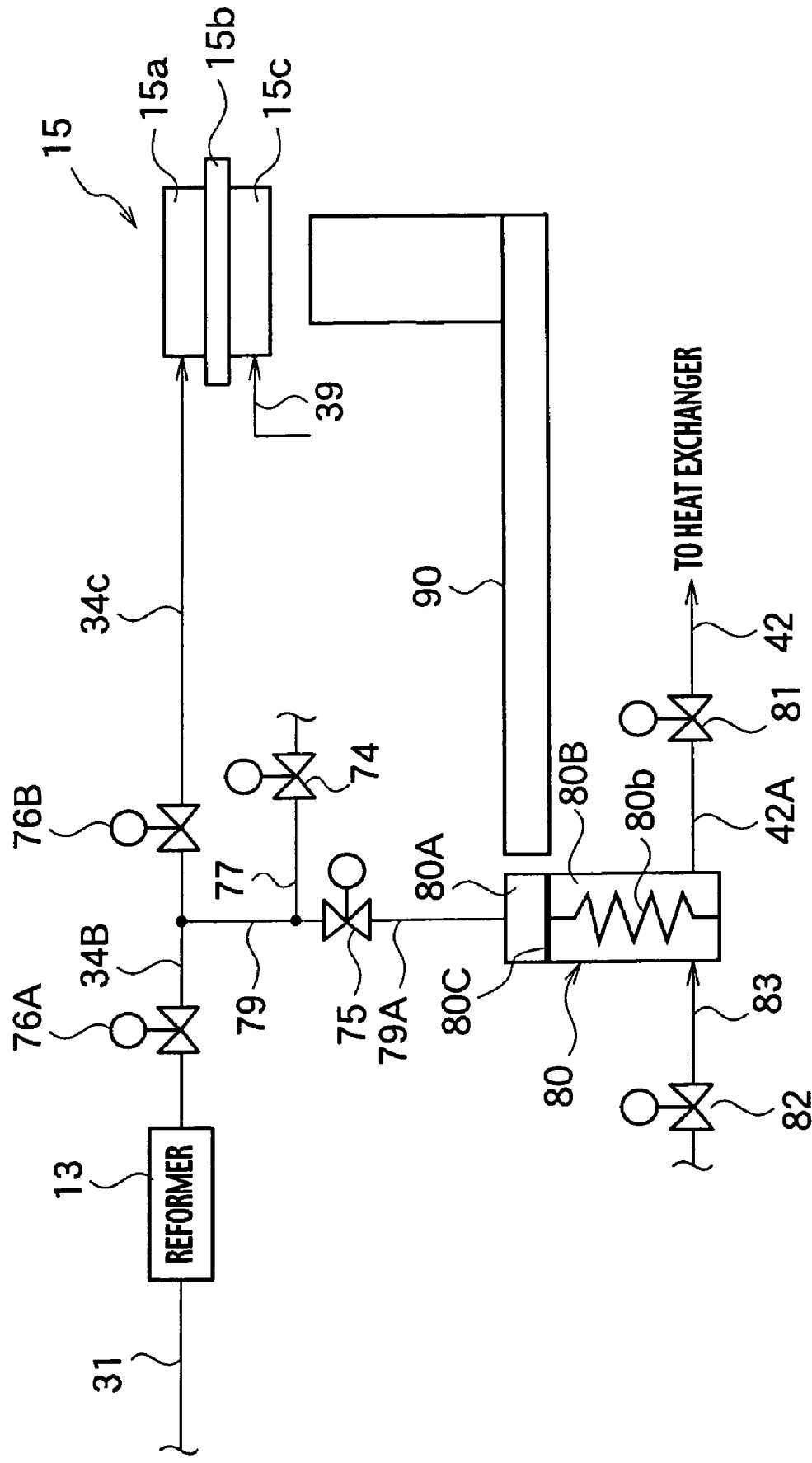
FIG. 9 is a block diagram showing an example of a first modification of the first oxygen supply unit shown in FIG. 8.

As shown in FIG. 9, in a fuel cell system according to a first example of the third modification of the second embodiment of the present invention, a heat pipe 90 is interposed between the first oxygen supply unit 80 and the cell unit 15. Other points are approximately the same as those of the constitution shown in FIG. 8, and thus, detailed description will be omitted. As the heat pipe 90, for example, a tube made of metal such as copper, iron and stainless steel can be used. Inside of the heat pipe 90, a wick is formed and an operation fluid can been closed in the wick. According to the fuel cell system 107 shown in FIG. 9, heat generated in the cell unit 15 is transferred to the oxygen supply unit 80A via the heat pipe 90. Thus, temperature fall occurred in the first chamber 80 by expanding the gas is prevented. Furthermore, pressure of the air acting from the second chamber 80B can be maintained at higher level.

Second Example of the Third Modification

Figure 10:
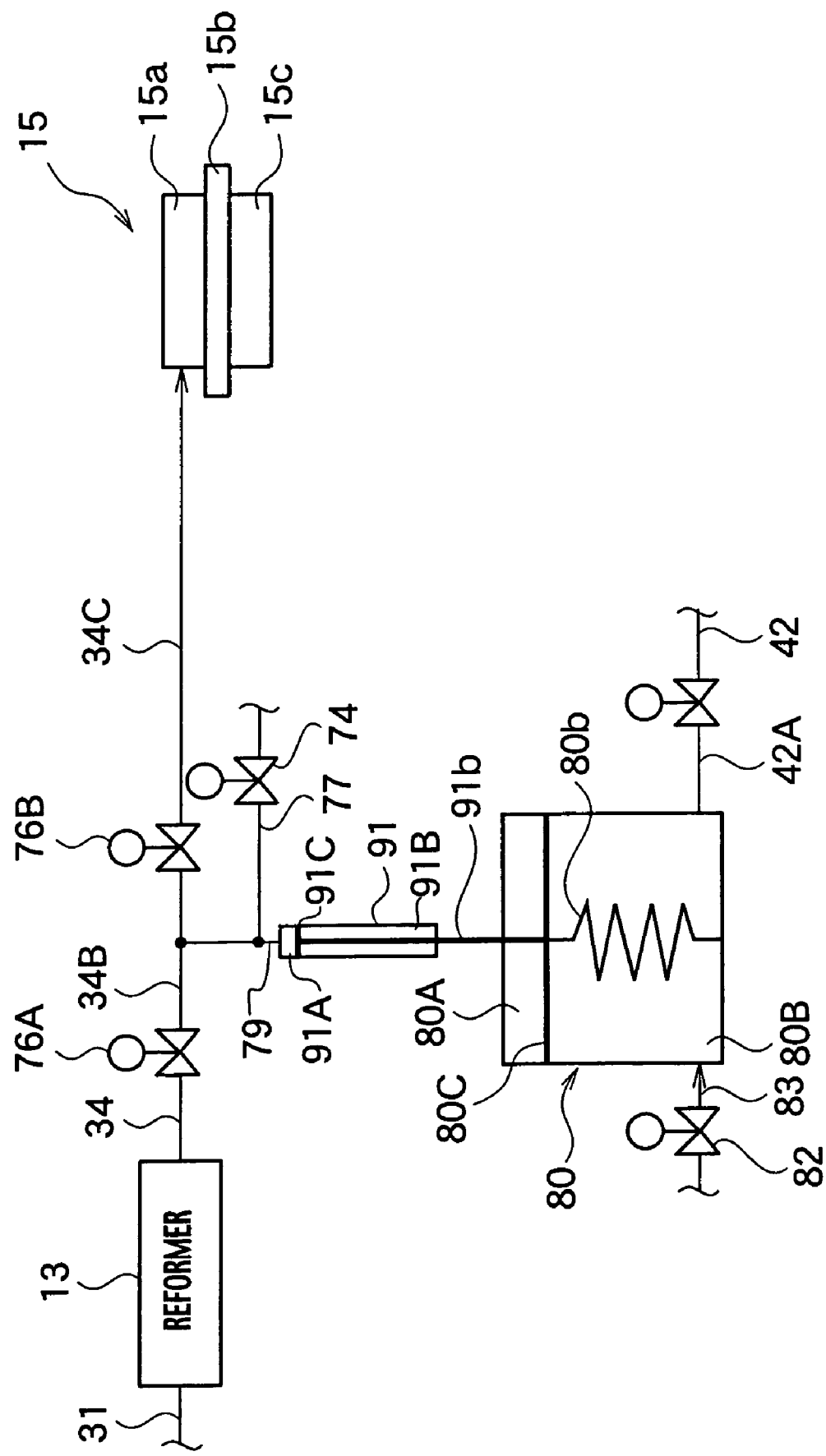
FIG. 10 is a block diagram showing a second modification of an oxygen supply unit shown in FIG. 8.

As shown in FIG. 10, in a fuel cell system according to a second example of the third modification of the second embodiment of the present invention, a fluid cylinder 91 is located at an upstream side of the first chamber 80A. Other points are approximately the same as those of the constitution shown in FIG. 8, and thus, detailed description will be omitted. The fluid cylinder 91 is separated into a first chamber 91A and a second chamber 91B by use of a movable partition 91C (a second partition) such as a piston and a diaphragm. Between the partition 91C and the partition 80C, a piston rod 91b is interposed. An upper part of the first chamber 91A is coupled to the pipe 79. As shown in FIG. 10, a volume of the fluid cylinder 91 is smaller than that of the first oxygen supply unit 80. Thus, for example, when it is assumed that a surface area of the partition 91C is 0.25 cm$^2$ and a surface area of the partition 80C is 25 cm$^2$, an amount of air pushed out by the partition 80C is about 100 times as much as an amount of air pushed out by the partition 91C. Note that a pressure of the air supplied from the second chamber 80B is about 0.01 kgf/cm$^2$. Thus, even if the fuel is expanded by about 100 times, the fuel can be supplied.

Third Example of the Third Modification

Figure 11:
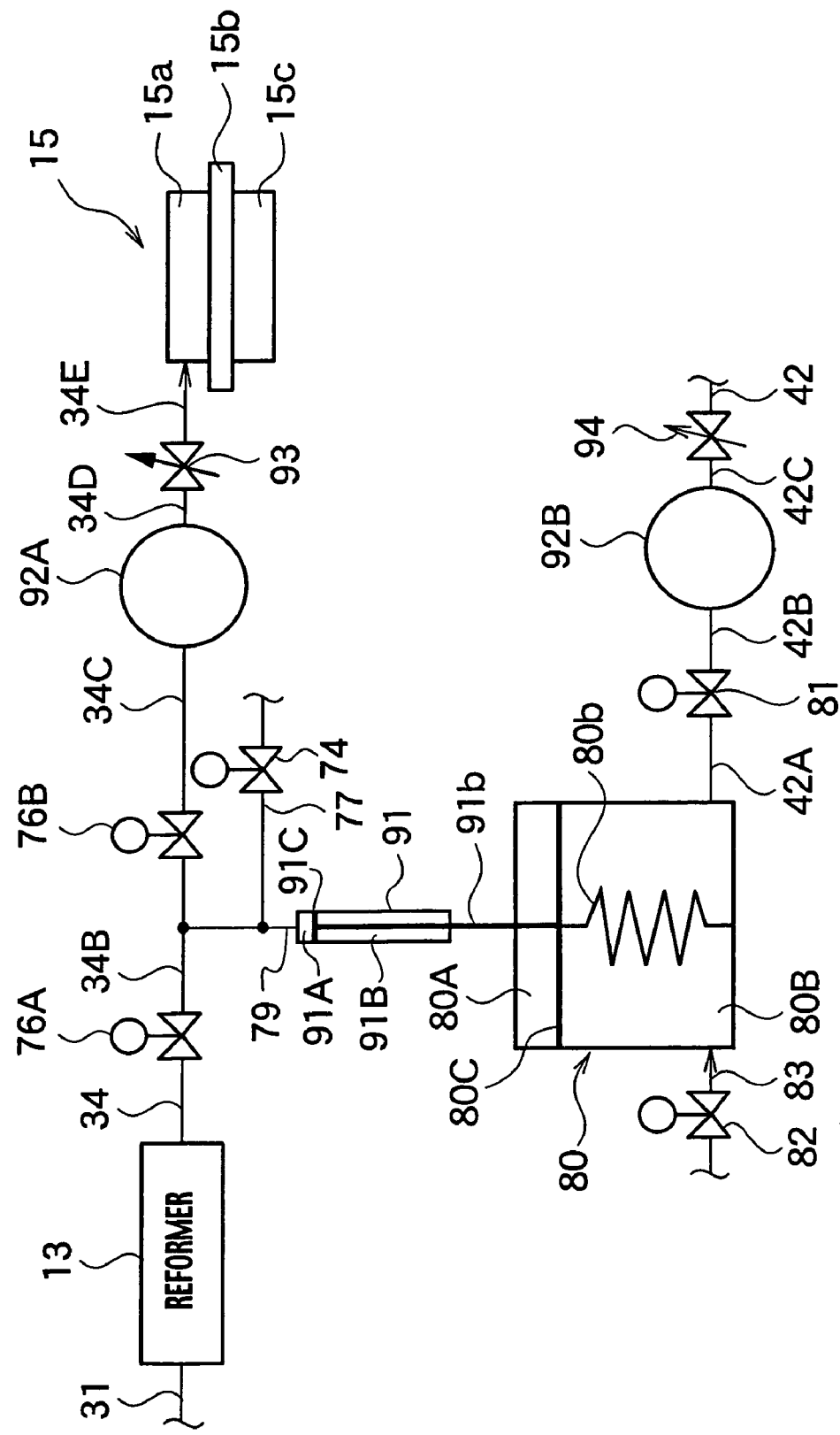
FIG. 11 is a block diagram showing a third modification of a first oxygen supply unit shown in FIG. 8.
Figure 12:
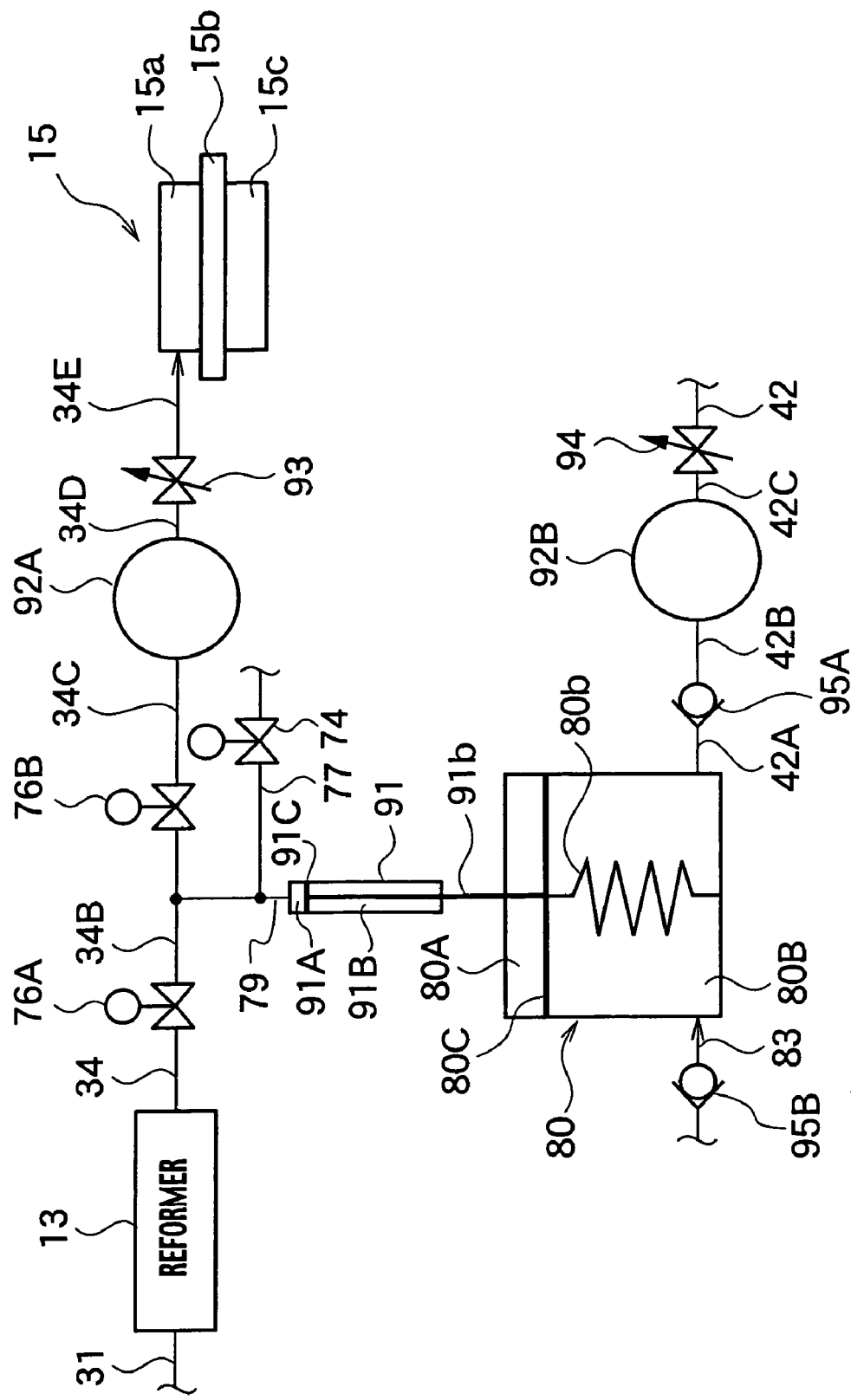
FIG. 12 is a block diagram showing a modification of a variable conductance valve shown in FIG. 11.

As shown in FIG. 11, a fuel cell system according to a third example of the third modification of the second embodiment of the present invention further includes a first buffer tank 92A coupled to an upstream side of the fuel electrode 15a, and a second buffer tank 92B coupled to a downstream side of the second chamber 80B. Other points except for the first buffer tank 92A and the second buffer tank 92B are approximately the same as those of the constitution shown in FIG. 8, and thus, detailed description will be omitted. An upstream side of the first buffer tank 92A is coupled to the variable conductance valve 76B via the pipe 34C and a downstream side thereof is coupled to a conductance control valve 93 via a pipe 34D. The conductance control valve 93 is coupled to the cell unit 15a via a pipe 34E. Meanwhile, an upstream side of the buffer tank 92B is coupled to the variable conductance valve 81 via the pipe 42B and a downstream side thereof is coupled to a conductance control valve 94 via a pipe 42C. A pipe 42 is coupled to a downstream side of the conductance control valve 94. According to the fuel cell system shown in FIG. 11, fluctuations in a conductance of supplied gas due to driving of a fluid pressure cylinder can be reduced by the first and second buffer tank 92A and 92B and the conductance control valves 93 and 94 coupled to an downstream side of the first and second buffer tank 92A and 92B. Thus, fuel and air can be stably supplied to the cell unit 15. Note that, as shown in FIG. 12, by use of check valves 95A and 95B in place of the variable conductance valves 81 and 82, a similar effect can be obtained.

Figure 13:
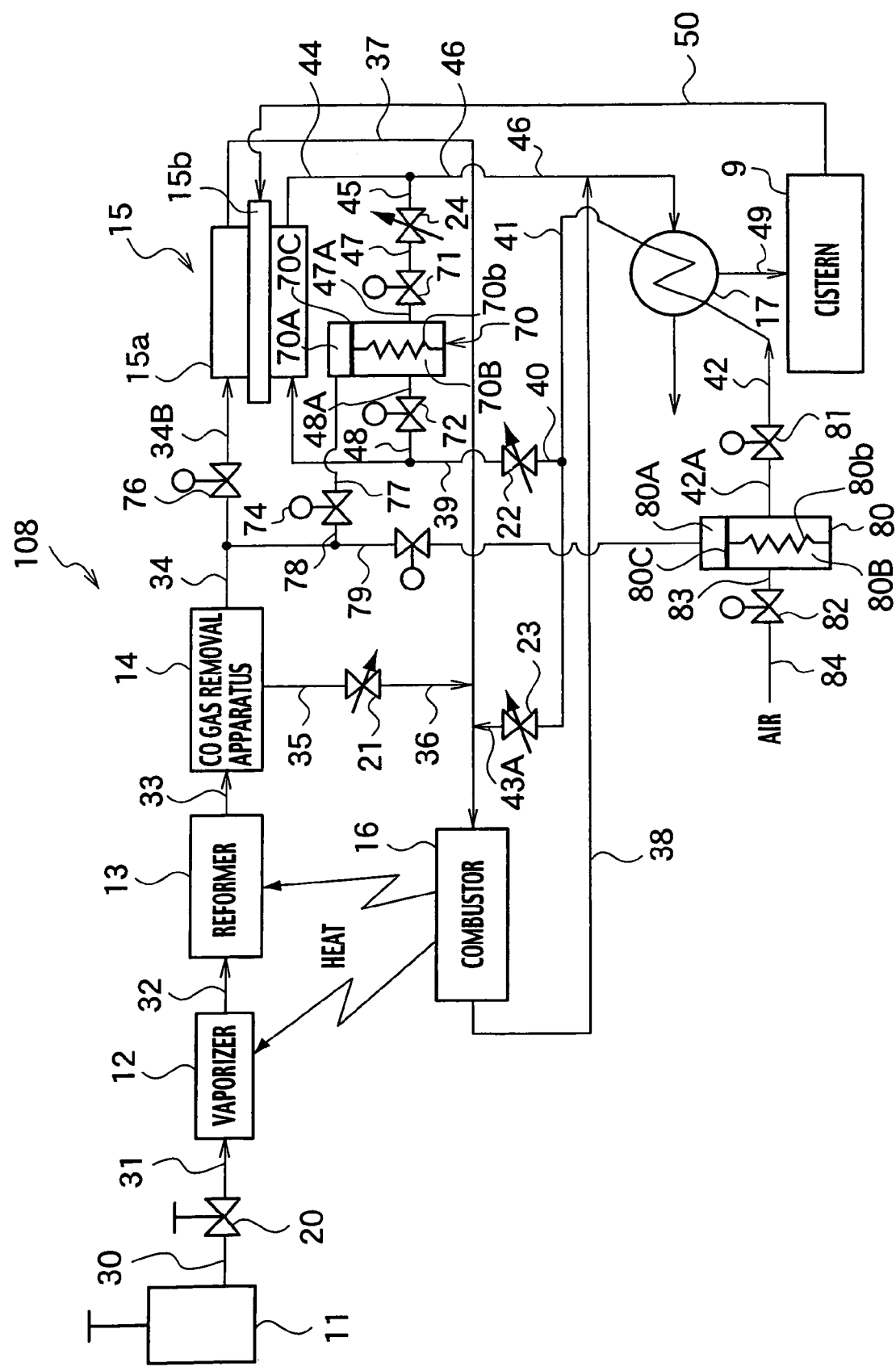
FIG. 13 is a block diagram showing an example of applying the first oxygen supply unit shown in FIG. 8 to FIG. 1.

Various modifications will become possible for those skilled in the art after receiving the teachings of the present disclosure without departing form the scope thereof. For example, as shown in FIG. 13, by adopting the first oxygen supply unit 80 and the second oxygen supply unit 70 shown in FIGS. 9 to 12 as the pump shown in FIG. 1, a fuel cell system requiring no pump or compressor can be provided. Furthermore, the gas introduced to the first and second oxygen supply units 80 and 70 shown in FIG. 9 to FIG. 12, pressurized fuel such as DME can be useful instead of the reformed hydrogen rich gas.

What is claimed is:
1. A fuel cell system comprising:
   a fuel tank configured to store a fuel including water at a pressure higher than atmospheric pressure;
   a vaporizer configured to vaporize the fuel;
   a reformer configured to reform the vaporized fuel into a hydrogen rich gas;
   a CO gas removal apparatus configured to remove CO gas in the hydrogen rich gas;
   a valve connecting the CO gas removal apparatus and a combustor, the valve being configured to maintain an upstream side of the CO gas removal apparatus at a pressure higher than atmospheric pressure;
   a cell unit configured to generate electricity by allowing the hydrogen rich gas to react with oxygen; and
   an oxygen supply unit configured to supply oxygen to the cell unit and including,
      a first chamber coupled between the CO gas removal apparatus and a fuel electrode of the cell unit,
      a second chamber connected to an air electrode of the cell unit, and a partition disposed between the first chamber and the second chamber.

2. The system of claim 1, wherein the cell unit includes: a fuel electrode being supplied with the hydrogen rich gas; an air electrode being supplied with oxygen so as to react with hydrogen rich gas and to generate electricity; and a polymer film interposed between the fuel electrode and the air electrode.

3. The system of claim 1, wherein the saturated vapor pressure of the fuel at room temperature is higher than atmospheric pressure.

4. The system of claim 1, wherein the fuel includes a solution of dimethyl ether and water.

5. The system of claim 1, wherein a semipermeable membrane to filter out hydrogen selectively is located in the CO gas removal apparatus.

6. The system of claim 1, further comprising a pressurized tank connected to an upstream side of the fuel tank.

7. The system of claim 1, further comprising a heat pipe interposed between the oxygen supply unit and the cell unit.

8. The system of claim 1, further comprising a fluid cylinder located at an upstream side of the first chamber.

9. The system of claim 8, wherein a surface area of a second partition disposed in the fluid cylinder is smaller than the partition disposed in the oxygen supply unit.

10. The system of claim 1, wherein a first buffer tank is coupled to an upstream side of the first chamber and a second buffer tank is coupled to a downstream side of the second chamber.

11. The system of claim 1, wherein a check valve is coupled to the second chamber.

* * * * *